(12) United States Patent
Erimli et al.

(10) Patent No.: US 6,760,341 B1
(45) Date of Patent: Jul. 6, 2004

(54) SEGMENTION OF BUFFER MEMORIES FOR SHARED FRAME DATA STORAGE AMONG MULTIPLE NETWORK SWITCH MODULES

(75) Inventors: Bahadir Erimli, Campbell, CA (US); Gopal Krishna, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/512,591

(22) Filed: Feb. 24, 2000

(51) Int. Cl.[7] .......................... H04L 12/28; H04L 12/56
(52) U.S. Cl. ...................................... 370/412; 370/386
(58) Field of Search ........................ 370/244, 412–429, 370/385–389, 392, 396, 398, 422

(56) References Cited

U.S. PATENT DOCUMENTS

| | | | | |
|---|---|---|---|---|
| 5,777,987 A | * | 7/1998 | Adams et al. | 370/336 |
| 5,953,335 A | | 9/1999 | Erimli et al. | |
| 6,021,132 A | * | 2/2000 | Muller et al. | 370/412 |
| 6,246,680 B1 | * | 6/2001 | Muller et al. | 370/389 |
| 6,333,917 B1 | * | 12/2001 | Lyon et al. | 370/236 |
| 6,473,432 B1 | * | 10/2002 | Nishimura et al. | 370/412 |
| 6,487,199 B1 | * | 11/2002 | Erimli | 370/360 |
| 6,504,846 B1 | * | 1/2003 | Yu et al. | 370/412 |
| 6,546,010 B1 | * | 4/2003 | Merchant et al. | 370/389 |
| 6,556,578 B1 | * | 4/2003 | Silberschatz et al. | 370/412 |

OTHER PUBLICATIONS

Oskouy et al. (US PUB 2002/0003795A1) discloses in–line packet processing.*
Bonomi et al. (US PUB 2002/0105952A1) discloses flexible scheduler in an ATM switch.*
Kadambi et al. (US PUB 2001/0043611) discloses high performance self balancing low cost network switching architecture based on distributed hierarchical shared memory.*

* cited by examiner

*Primary Examiner*—Ajit Patel
*Assistant Examiner*—Yvonne Quy Ha
(74) *Attorney, Agent, or Firm*—Manelli Denison & Selter PLLC; Leon R. Turkevich

(57) ABSTRACT

A network switching system having a plurality of multiport switch modules and respective connected buffer memory devices assigns in each of the buffer memory devices a memory segment for storage of frame data from a corresponding one of the switch modules. Each memory device is divided into memory segments, also referred to as memory regions, wherein each memory segment is configured for storing frame data from a corresponding one of the switch modules. Hence, each switch module is configured for writing frame data, for a data frame received on one of the corresponding switch ports, into the corresponding assigned memory segment of each of the buffer memory devices. Any one of the switch modules can access any location of the buffer memory devices, enabling any one switch module to retrieve frame data from the buffer memory devices that was stored by another one of the switch modules. In addition, the assignment of memory segments enables a switch module having accessed frame data from the buffer memory to determine the switch module that originally stored the frame data based on the location of the stored frame data within one of the memory segments, simplifying buffer memory resource management.

18 Claims, 3 Drawing Sheets

SEGMENTION OF BUFFER MEMORIES FOR SHARED FRAME DATA STORAGE AMONG MULTIPLE NETWORK SWITCH MODULES

BACKGROUND OF THE INVENTION

1. Field of the Invention

The present invention relates to arrangements for switching data packets in switched local area networks, in particular to arrangements for cascading multiple multiport network switches to increase the number of ports in a network switching arrangement.

2. Background Art

A multiport network switch in a packet switching network is coupled to stations on the network through its multiple ports. Data sent by one station on a network to one or more other stations on the network are sent through the network switch. For example, commonly-assigned U.S. Pat. No. 5,953,335 discloses a network switch configured for switching layer 2 type Ethernet (IEEE 802.3) data packets between different network nodes. The network switch determines the destination of a received data frame from the data frame header. The network switch then transmits the data frame from the appropriate port to which the destination network station is connected.

A single Ethernet network switch may have a number of 10/100 Mbps ports, equaling, for example, 12 ports. The number of end stations connected to the single network switch is limited by the number of ports (i.e., port density) on the network switch. However, today's users of networking devices demand flexibility and scalability without such constraints. To address this need, manufacturers have developed modular architectures that enable cascading of identical networking devices or network switch modules. By cascading these devices in a loop, port density can be readily increased without redesign or development of costly interfaces.

Unfortunately, as the number of cascaded switches increases, so does the system latency (i.e., the aggregate processing delay of the switches). This system latency is attributable in part by the manner in which the switches store and retrieve the data frames in memory. One traditional memory architecture employs individual, local memories for each cascaded switch, as shown in FIG. 1. In this example, three multiport switches 12a, 12b and 12c are cascaded together to permit the exchange of data frames received by any one of the switches and subsequent forwarding of the data frames out of a different multiport switch. These switches 12a, 12b and 12c have a memory interface, e.g., 14a, 14b, and 14c, respectively, that enable the switches 12a, 12b and 12c to access their respective memories 16a, 16b, and 16c to write and read the data frames.

For purposes of explanation, assume that a data frame is received at a port (i.e., receive port) on switch 12a and that the data frame is destined for a node attached to a port on a different switch 12c. The switch 12a first stores the received data frame in its corresponding memory 16a, and then determines whether to output the received data frame on one of its own network switch ports, or to send the data frame to the next switch in sequence. Since the data frame is destined for switch 12c, the data frame is retrieved from the memory 16a and forwarded to the next switch 12b via the switch 12a's cascade port (i.e., the port to which the neighboring switches are connected). Upon receiving the data frame, the switch 12b stores the data frame in its corresponding memory 16b. The switch 12b then determines that the data frame is destined for switch 12c, hence the switch 12b retrieves the data frame from the memory 16b and forwards the data frame to the next switch 12c via the switch 12b's cascade port. Once the data frame arrives at switch 12c, the switch 12c writes the data frame into its corresponding memory 16c while determining whether the data frame should be output on one of its switch ports. Upon determining that the data frame should be output on one of its switch ports that serves the destination node, the switch 12c reads the stored data frame from the memory 16c and outputs the data frame on the appropriate switch port.

As evident by this example, the successive series of write and read operations between the multiple memory devices imposes substantial delays within the switching system. Hence, the addition of multiple switch modules and a cascaded sequence may create substantial latency problems, resulting in congestion within the switching system.

SUMMARY OF THE INVENTION

There is a need for an arrangement that enables multiple network switch modules to be cascaded for increasing port density, while minimizing system latency.

There is also a need for an arrangement that enables multiple network switch modules to be cascaded, without the necessity of repeated storage and transfer of frame data between respective buffer memory devices.

There is also a need for arrangement that provides an efficient management of stored frame data in a network switching system having multiple cascaded switch modules.

These and other needs are attained by the present invention, where a network switching system having a plurality of multiport switch modules and respective connected buffer memory devices assigns in each of the buffer memory devices a memory segment for storage of frame data from a corresponding one of the switch modules. In particular, each memory device is divided into memory segments, also referred to as memory regions, wherein each memory segment is configured for storing frame data from a corresponding one of the switch modules. Hence, each switch module is configured for writing frame data, for a data frame received on one of the corresponding switch ports, into the corresponding assigned memory segment of each of the buffer memory devices. In contrast, any one of the switch modules can access any location of the buffer memory devices, enabling any one switch module to retrieve frame data from the buffer memory devices that was stored by another one of the switch modules. In addition, the assignment of memory segments enables a switch module having accessed frame data from the buffer memory to determine the switch module that originally stored the frame data based on the location of the stored frame data within one of the memory segments, simplifying buffer memory resource management.

One aspect of the present invention provides a method in a network switching system having switch modules and buffer memory devices, each of the buffer memory devices connected to a corresponding one of the switch modules. The method includes assigning in each of the buffer memory devices a memory segment for storage of frame data from a corresponding one of the switch modules. The method also includes storing in each of the buffer memory devices a corresponding portion of a data frame, received by a first of the switch modules, at a same prescribed location within the corresponding memory segment assigned to the first of the switch modules. The assignment of a memory segment for each of the switch modules provides simplified buffer memory resource management, since any switch module accessing any one of the buffer memory devices can identify, for a given stored data frame, the switch module that wrote the data frame into the buffer memory devices based on the location of the stored data frame within the buffer memory devices. Hence, the switch modules can identify stored data frames using frame pointers, where the frame pointers can be returned to the originating switch module (i.e., the switch module that wrote the data frame into the buffer memory devices) after the corresponding data frame has been output from the switching system. In addition, the storage of a corresponding portion of a data frame in each of the buffer memory devices at the same prescribed location tables any one of the switch modules to read the frame data using a single read operation.

Another aspect of the present invention provides a network switching system. The network switching system includes first and second multiport switch modules configured for receiving first and second data frames, respectively, each multiport switch module having a memory interface. The network switching system also includes a data bus configured for passing portions of the first and second data frames, selected by the memory interfaces according to a prescribed protocol, between the first and second multiport switch modules, and first and second buffer memory devices. The first and second buffer memory devices are connected to the first and second multiport switch modules by the respective memory interfaces. The memory interfaces configured for storing, in each of the first and second buffer memory devices according to the prescribed protocol, a corresponding portion of the first data frame at a first prescribed location within a first memory region assigned for the first switch module, and a corresponding portion of the second data frame at a second prescribed location within a second memory region assigned for the second switch module. Hence, the multiport switch modules can pass memory pointers between each other that specify a given stored data frame based on the stored location in the buffer memory devices; moreover, the multiport switch modules can identify the originating source of the memory pointers, and hence the stored data frame, based on the memory location specified by the memory pointer being located within one of the assigned memory regions.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
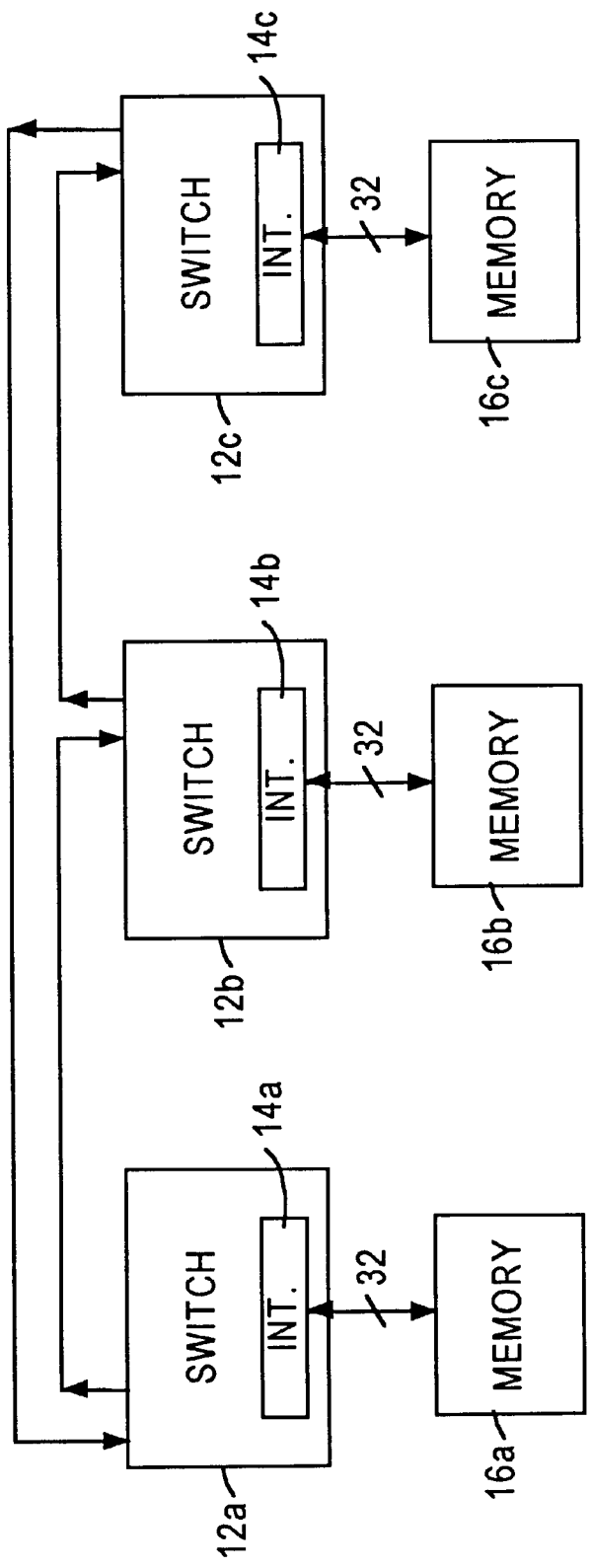
FIG. 1 is a diagram illustrating a conventional (prior art) switching arrangement that cascades multiple switch modules.
Figure 2:
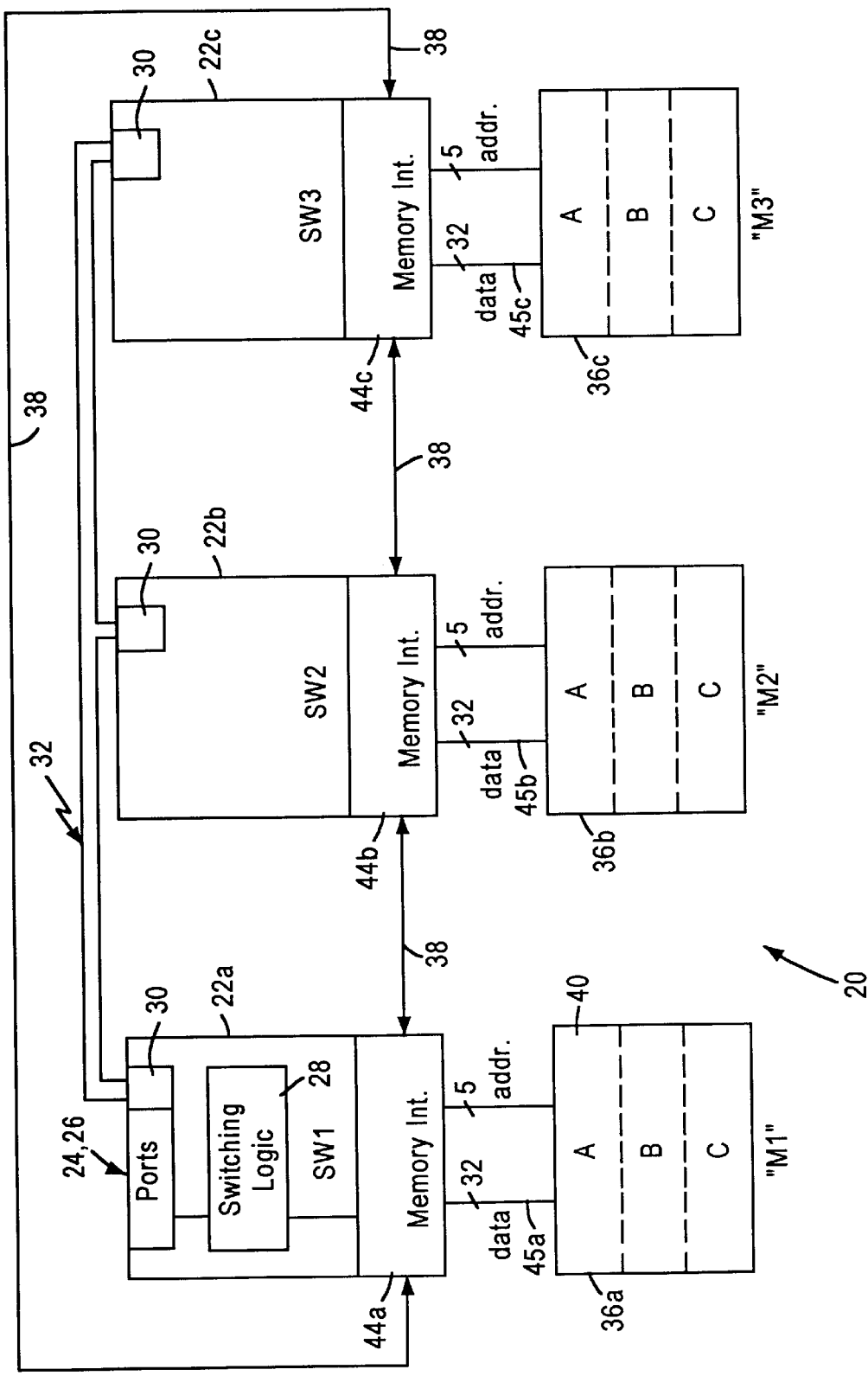
FIG. 2 is a diagram illustrating a switching system having buffer memory devices with assigned memory segments according to an embodiment of the present invention.

FIG. 2 is a block diagram illustrating a network switching system 20 in a packet switched network, such as an Ethernet (IEEE 802.3) network. The network switching system 20 includes integrated (i.e., single chip) multiport switches 22 that enable communication of data packets between network stations (not shown) via respective network switch ports 24. The network stations, for example client workstations, are typically configured for sending and receiving data packets at 10 Mbps or 100 Mbps according to IEEE 802.3 protocol. Each of the integrated multiport switches 22 may also include a gigabit Ethernet link 26 for transfer of data packets to a server, a gateway to a high-speed backbone network, or the like. The 10/100 Mbps network stations may operate in either half duplex mode or full duplex mode.

Each of the integrated multiport switches 22, also referred to as multiport switch modules, also include switching logic 28 configured for switching the data packets received from the network switch ports 24 or 26. In particular, the switching logic 28 has an internal media access control (MAC) address lookup table (not shown) that stores, for each network station connected to the corresponding multiport switch 22, the MAC address of the network station and the switch port number of the network switch port 24 or 26 servicing that network station. Hence, the switching logic 28, upon receiving a data frame, will first search the MAC address lookup table using the source MAC address in the received data packet to determine whether the MAC address for the transmitting network station having transmitted the data frame is already stored in the MAC address lookup table; if the switching logic 28 does not locate the source MAC address in the MAC address lookup table, the switching logic 28 updates the MAC address lookup table with the source MAC addresses and the corresponding switch port number for the network switch port 24 or 26 having received the data packet. The switching logic 28 then searches the MAC address lookup table using the destination MAC address in the received data packet to determine the output port for the received data packet; if the destination MAC address is not found in the MAC address lookup table, the switching logic 28 forwards a frame pointer specifying the location of the received data packet to the other multiport switches 22 via an expansion port 30 (i.e., a network switch port configured for transferring a frame pointer to another multiport switch 22) in an effort to locate the destination network station. Assuming one of the other multiport switches 22 locates the destination station, the switching logic 28 updates the MAC address lookup table by specifying the expansion port 30 as the output switch port for future transfer of the frame pointer onto the expansion bus 32. If none of the other multiport switches 22 locate the destination station, then all the switch modules 22 flood all the output ports in an attempt to locate the destination station.

As shown in FIG. 2, the network switching system 20 includes a plurality of buffer memory devices 36 connected to respective multiport switches 22, and a data bus 38 configured for passing frame data between the switch modules 22, described below. The network switch port 22 having received the data packet (e.g., 22a) stores the received data frame using a shared memory arrangement, where a corresponding portion of the data frame is stored in each of the buffer memory devices 36 at the same prescribed location within a memory segment 40 assigned to the corresponding switch module 22.

In particular, each of the switch modules 22 include a memory interface 44 configured for controlling the storage of frame data in the buffer memory devices 36 according to a prescribed protocol. The memory interfaces 44 assign, according to the prescribed protocol, a memory segment 40 in each of the buffer memory devices 36 to a corresponding one of the network switch modules 22. For example, the memory interfaces 44 assign memory segment A in each of the buffer memory devices 36 to the switching module 22a, memory segment B in each of the buffer memory devices 36 to the switching module 22b, and memory segment C in each of the buffer memory devices 36 to the switching module 22c. Hence, the switch module 22a can write frame data only into memory segment A of the buffer memory devices 36a, 36b, and 36c; the switch module 22b can write frame data only into memory segment B of the buffer memory devices 36a, 36b, and 36c; and the switch module 22c can write frame data only into memory segment C of the buffer memory devices 36a, 36b, and 36c.

Hence, any one of the switch modules 22 can store in each of the buffer memory devices 36 a corresponding portion of a data frame at the same prescribed location within its corresponding assigned memory segment. Consequently, each memory interface 44 can use a single frame pointer that specifies a specific memory address location to read frame data for a stored data frame from the memory devices 36. In addition, the memory address location specified in the frame pointer will belong to one of the assigned memory segments A, B, or C, enabling the memory interfaces 44 to identify the originating switch module 22 that stored the frame data; consequently, the memory interfaces 44, upon identifying the originating switch module 22 based on the memory address location specified in the frame pointer, will be able to reconstruct the data frame from the portions stored in the memory devices 36 in the proper sequence that corresponds to the original storage sequence of the originating switch module. Finally, the ability to identify the originating switch module 22 (e.g., 22a) enables the other switch modules (e.g., 22c) to return the frame pointer back to the originating switch module for reclaiming of buffer memory resources after the stored data frame has been transmitted by the switch modules.

Figure 3A:
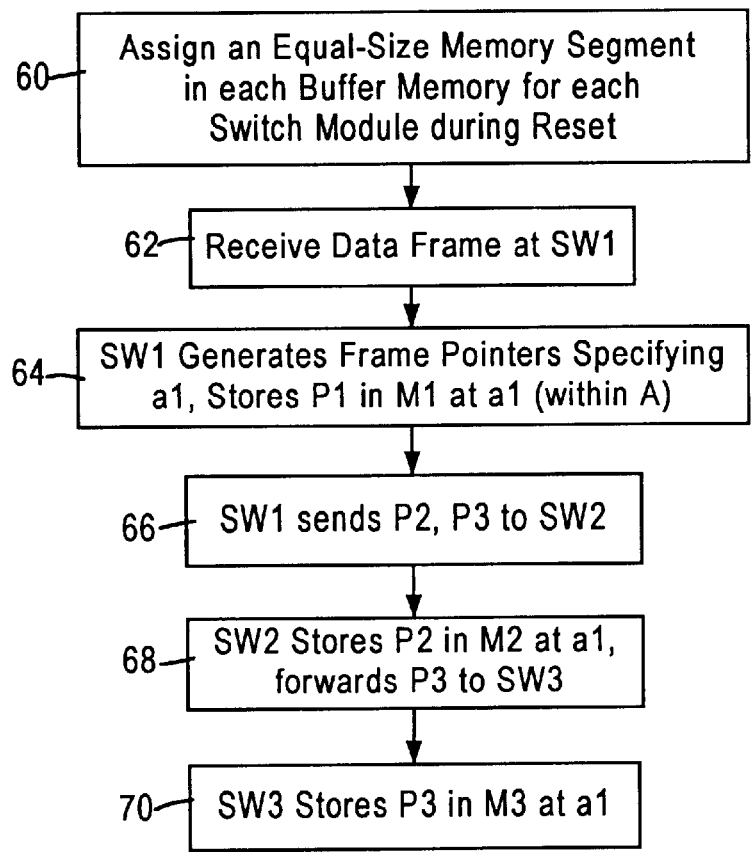
FIGS. 3A and 3B are diagrams summarizing the method of storing and retrieving frame data by the switch modules from the buffer memory devices according to an embodiment of the present invention.
Figure 3B:
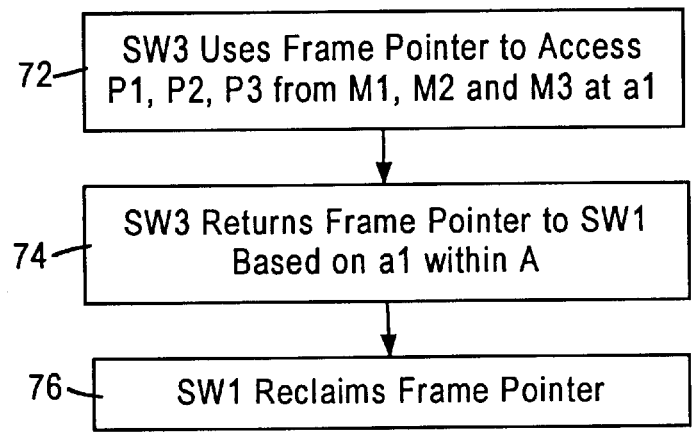

FIGS. 3A and 3B are diagrams summarizing the method of storing and retrieving frame data by the switch modules from the buffer memory devices according to an embodiment of the present invention. The method begins in step 60, where each of the memory interfaces 44a, 44b and 44c assign in the corresponding connected buffer memory device 36 a memory segment 40 for storage of frame data for each of the switch modules. Hence, each memory interface 44 (e.g., 44a) reserves memory segments A, B, and C in the corresponding connected buffer memory device 36 (e.g., 36a) for storage of frame data by switch modules 22a, 22b and 22c, respectively. Preferably each memory interface 44 assigns each of the memory segments A, B, and C an equal size.

Once the buffer memory devices 36 has been partitioned such that each switch module 22 has a corresponding memory segment 40, the switch modules 22 can begin switching operations. Assume that one of the switch modules 22 (e.g., switch module 22a) receives a data packet in step 62 from a connected network station on one of its network switch ports 24 or 26. The switch module 22a sends the data frame to its corresponding memory interface 44a for storage in the buffer memory devices 36 while the switch module 22a performs frame forwarding decisions on the received data packet using its switching logic 28. The memory interface 44a generates a frame pointer in step 64 that specifies a memory location (e.g., a1) within the assigned memory segment (A) 40, and stores a first portion (P1) of the data frame in the corresponding local memory 36a. The memory interface 44a then sends other portions (P2, P3) of the data frame along with the corresponding frame pointer to the next switch module 22b in step 66 via the data bus 38.

In response to receiving the two portions of the data frame (P2, P3), the memory interface 44b stores the second portion (P2) of the data frame in the memory location (a1) within the assigned memory segment (A) in step 68 as specified by the supplied frame pointer, and forwards the third portion of the data frame (P3) and the frame pointer to the next switch module 22c via the data bus 38. The memory interface 44c stores the third portion (P3) of the data frame in the memory location (a1) within the assigned memory segment (A) in step 70. As apparent from the foregoing, multiple transfers may be occurring between the memory interfaces 44a, 44b and 44c according to a prescribed cascaded sequence to optimize bandwidth on the data bus 38.

FIG. 3B illustrates the reading of frame data by any one of the switch modules 22 from the shared buffer memory devices 36a, 36b and 36c. In contrast to the storage of a data frame, any one of the switch modules 22 can access any part of the memory segments A, B, and/or C to read frame data from the buffer memory devices 36. Assuming that the switching logic 28 of the switch module 22c determines to output the stored data frame located at memory location a1 within the assigned memory segment (A), the memory interface 44c uses the frame pointer for the stored data frame to access in step 72 the portions of the data frame P1, P2, and P3 from memory location a1 in the buffer memory devices 36a, 36b, and 36c, respectively. As described above, the memory interface 44c recognizes that the data frame stored at location a1 in memory segment A was originally written to the buffer memory devices 36 by the switch module 22a; hence, the memory interface 44c recognizes that the original data frame is recovered by reassembling the data frame portions according to the sequence P1, P2, P3 recovered from the buffer memory devices 36a, 36b and 36c, respectively.

Once the memory interface 44c recovers the stored data frame for transmission by the switch module 22c on one of its corresponding network switch ports, the switch module 22c returns in step 74 the frame pointer for the transmitted data frame back to the originating switch module 22a based on the address a1, within the memory segment A, specified by the frame pointer. The originating switch module 22a then reclaims the frame pointer in 76 for reuse of the memory location a1 for another data frame.

According to the disclosed embodiment, each of the buffer memory devices is assigned a memory segment for storage of frame data from a corresponding one of the switch modules, enabling each switch module to write frame data into each of the buffer memory devices at the same prescribed location within the corresponding memory segment. Hence, a single frame pointer can be used to identify frame data stored in the multiple buffer memory devices. Moreover, any one of the switch modules can identify the switch module having stored the frame data based on the address location specified in the frame pointer, enabling any switch module to reassemble the stored data packet for transmission, and return the frame pointer to the originating switch module for reclaiming of the memory space. Hence, the disclosed embodiment provides scalability by enabling an unlimited number of switch modules to be connected without a loss of performance.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switching system having connected switch modules and buffer memory devices, each of the buffer memory devices connected to a corresponding one of the switch modules, the method comprising:

assigning in each of the buffer memory devices a memory segment for storage of frame data from a corresponding one of the switch modules; and storing in each of the buffer memory devices a corresponding portion of a data frame, received by a first of the switch modules, at a same prescribed location within the corresponding memory segment assigned to the first of the switch modules.

2. The method of claim 1, wherein the assigning step includes assigning each of the memory segments an equal size.

3. The method of claim 1, wherein the storing step includes:

storing a first of the portions of the data frame by the first of the switch modules into the corresponding connected buffer memory device; and transferring the remaining portions of the data frame to remaining ones of the switch modules via a data bus.

4. The method of claim 3, wherein the data bus is configured for connecting the switch modules in a cascaded sequence, the storing step further including:

receiving by each of the remaining ones of the switch modules at least a corresponding one of the remaining portions of the data frame from the data bus; and storing by each of the remaining ones of the switch modules the corresponding one of the remaining portions of the data frame into the corresponding connected buffer memory device.

5. The method of claim 3, wherein the storing step further includes:

receiving the remaining portions of the data frame by a second of the switch modules via the data bus, the second of the switch modules coupled to the first of the switch modules via the data bus;

storing, by the second of the switch modules, one of the remaining portions of the data frame into the corresponding connected buffer memory device; and transferring, by the second of the switch modules, at least another remaining portion of the data frame to a third of the switch modules coupled to the second of the switch modules via the data bus.

6. The method of claim 3, further comprising generating a frame pointer, by the first of the switch modules, that specifies storage of at least a portion of the data frame at the prescribed location in each of the buffer memory devices.

7. The method of claim 6, further comprising retrieving, by any one of the switch modules, the at least a portion of the data frame based on the frame pointer.

8. The method of claim 7, further comprising returning the frame pointer by said any one of the switch modules to the first of the switch modules following the retrieving step based on the prescribed location specified in the frame pointer.

9. The method of claim 1, further comprising generating a frame pointer, by the first of the switch modules, that specifies storage of at least a portion of the data frame at the prescribed location in each of the buffer memory devices.

10. The method of claim 9, further comprising retrieving, by any one of the switch modules, the at least a portion of the data frame based on the frame pointer.

11. The method of claim 10, further comprising returning the frame pointer by said any one of the switch modules to the first of the switch modules following the retrieving step based on the prescribed location specified in the frame pointer.

12. A network switching system comprising:

first and second multiport switch modules configured for receiving first and second data frames, respectively, each having a memory interface;

a data bus configured for passing portions of the first and second data frames, selected by the memory interfaces according to a prescribed protocol, between the first and second multiport switch modules; and first and second buffer memory devices connected to the first and second multiport switch modules by the respective memory interfaces, the memory interfaces configured for storing, in each of the first and second buffer memory devices according to the prescribed protocol, a corresponding portion of the first data frame at a first prescribed location within a first memory region assigned for the first switch module, and a corresponding portion of the second data frame at a second prescribed location within a second memory region assigned for the second switch module.

13. The system of claim 12, further comprising a third one of the switch modules and a third one of the buffer memory devices connected to the third switch module, the memory interfaces of the first, second, and third switch modules configured for assigning in each of the first, second, and third buffer memory devices the memory regions as equal-size memory regions for storage of frame data from the respective switch modules.

14. The system of claim 13, wherein the data bus is configured for connecting the first, second, and third switch modules in a cascaded arrangement.

15. The system of claim 14, wherein the first multiport switch module is configured for generating a first frame pointer that identifies storage of at least a portion of the first data frame at the first prescribed location within the first and second buffer memory devices.

16. The system of claim 15, wherein the second multiport switch module, in response to retrieving the at least a portion of the first data frame using the first frame pointer, returns the first frame pointer to the first multiport switch module based on the identified first prescribed location.

17. The system of claim 12, wherein the first multiport switch module is configured for generating a first frame pointer that identifies storage of at least a portion of the first data frame at the first prescribed location within the first and second buffer memory devices.

18. The system of claim 17, wherein the second multiport switch module, in response to retrieving the at least a portion of the first data frame using the first frame pointer, returns the first frame pointer to the first multiport switch module based on the identified first prescribed location.

* * * * *